United States Patent
Matsuo et al.

(10) Patent No.: US 9,407,413 B2
(45) Date of Patent: Aug. 2, 2016

(54) WIRELESS COMMUNICATION DEVICE, WIRELESS COMMUNICATION TERMINAL, AND AUTOMATIC REPEAT REQUEST CONTROL METHOD

(75) Inventors: Hidenori Matsuo, Kanagawa (JP); Takahisa Aoyama, Kanagawa (JP); Takashi Tamura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 266 days.

(21) Appl. No.: 14/112,623

(22) PCT Filed: Apr. 12, 2012

(86) PCT No.: PCT/JP2012/002561
§ 371 (c)(1),
(2), (4) Date: Oct. 18, 2013

(87) PCT Pub. No.: WO2012/147294
PCT Pub. Date: Nov. 1, 2012

(65) Prior Publication Data
US 2014/0036855 A1 Feb. 6, 2014

(30) Foreign Application Priority Data
Apr. 27, 2011 (JP) .................. 2011-099914

(51) Int. Cl.
*H04L 5/00* (2006.01)
*H04B 7/02* (2006.01)
(Continued)

(52) U.S. Cl.
CPC .............. *H04L 5/0053* (2013.01); *H04B 7/024* (2013.01); *H04L 1/1825* (2013.01);
(Continued)

(58) Field of Classification Search
None
See application file for complete search history.

(56) References Cited

U.S. PATENT DOCUMENTS

| 2009/0131056 A1* | 5/2009 | Bontu | ............... | H04W 36/0072 455/436 |
| 2010/0098045 A1* | 4/2010 | Miyazaki | .............. | H04L 1/1825 370/342 |

(Continued)

FOREIGN PATENT DOCUMENTS

WO  2010/048442 A1   4/2010

OTHER PUBLICATIONS

3GPP TR 36.814 V9.0.0 (Mar. 2010) 3rd Generation Partnership Project;Technical Specification Group Radio Access Network;Evolved Universal Terrestrial Radio Access (E-UTRA);Further advancements for E-UTRA physical layer aspects (Release 9).

(Continued)

Primary Examiner — Dung B Huynh
(74) Attorney, Agent, or Firm — Pearne & Gordon LLP

(57) ABSTRACT

A wireless communication device used in a communication system that utilizes a coordinated multiple-point technique has a determination section that determines another wireless communication device which performs coordinated multiple-point with respect to a wireless communication terminal; an allocation determination section that determines for a predetermined number of sub-frames a proportion of multiple-data-transmission automatic repeat request control to identical-data-transmission automatic repeat request control; an automatic repeat request control section that performs multiple-data-transmission automatic repeat request control; and an automatic repeat request control section that performs identical-data-transmission automatic repeat request control.

8 Claims, 12 Drawing Sheets

(51) Int. Cl.
    *H04L 1/18* (2006.01)
    *H04L 1/00* (2006.01)
(52) U.S. Cl.
    CPC ........... *H04L 1/1867* (2013.01); *H04L 5/0055* (2013.01); *H04L 1/1812* (2013.01); *H04L 5/0035* (2013.01); *H04L 2001/0097* (2013.01)

(56) References Cited

U.S. PATENT DOCUMENTS

| | | | | |
|---|---|---|---|---|
| 2010/0107028 | A1* | 4/2010 | Gorokhov | H04L 5/0035 714/748 |
| 2010/0273492 | A1* | 10/2010 | Liu | H04B 7/022 455/446 |
| 2011/0034171 | A1* | 2/2011 | Choi | H04B 7/024 455/436 |
| 2011/0038329 | A1* | 2/2011 | Luo | H04L 1/1854 370/329 |
| 2011/0249620 | A1* | 10/2011 | Yu | H04B 7/022 370/328 |
| 2012/0269140 | A1* | 10/2012 | Nam | H04B 7/024 370/329 |

OTHER PUBLICATIONS

ETSI TS 136 213 V10.1.0 (Apr. 2011) LTE; Evolved Universal Terrestrial Radio Access (E-UTRA); Physical layer procedures (3GPP TS 36.213 version 10.1.0 Release 10).

3GPP TSG-RAN 1#58bis Miyazaki, Japan, Oct. 12-16, 2009 R1-094251 "Efficient HARQ Protocol for SIC based DL CoMP".

International Search Report for PCT/JP2012/002561 dated Jun. 26, 2012.

* cited by examiner

FIG. 3

| TRANSMISSION DELAY TIME T EXISTING BETWEEN BASE STATIONS | MAXIMUM NUMBER OF PROCESSES USED IN MULTIPLE DATA TRANSMISSION HARQ CONTROL (Nmmax) | MAXIMUM NUMBER OF PROCESSES USED IN IDENTICAL DATA TRANSMISSION HARQ CONTROL | TOTAL NUMBER OF HARQ PROCESSES INCLUDED IN EIGHT SUB-FRAMES |
|---|---|---|---|
| T<T1 | 16 | 0 | 16 |
| T1≤T<T2 | 14 | 1 | 15 |
| T2≤T<T3 | 12 | 2 | 14 |
| T3≤T<T4 | 10 | 3 | 13 |
| T4≤T<T5 | 8 | 4 | 12 |
| T5≤T<T6 | 7 | 5 | 11 |
| T6≤T<T7 | 4 | 6 | 10 |
| T7≤T<T8 | 2 | 7 | 9 |
| T8≤T | 0 | 8 | 8 |

(T1<T2<···<T8)

WIRELESS COMMUNICATION DEVICE, WIRELESS COMMUNICATION TERMINAL, AND AUTOMATIC REPEAT REQUEST CONTROL METHOD

TECHNICAL FIELD

This invention relates to a wireless communication device, a wireless communication terminal, and an automatic repeat request control method that are employed in a communication system utilizing a coordinated multiple-point technique.

BACKGROUND ART

A standard setting organization 3GPP (The $3^{rd}$ Generation Partnership Project) is now going ahead with standardization of LTE-Advanced (Long Term Evolution Advanced: LTE-A) as a next generation communication standard that is compatible with an LTE (Long Term Evolution) standard. According to the LTE-A standard, a wireless communication device (hereinafter also called an "NE (Network Entity)") of a network (Evolved Universal Terrestrial Radio Access Network: E-UTRAN) provides one communication cell or more. The wireless communication device is a device that serves as an access point for a wireless communication terminal (User Equipment: UE), like a wireless communication base station (E-UTRAN NodeB: ENB), an outlying base station (Remote Radio Head: RRH), and a relay (Relay Node (NR) or a repeater). The wireless communication terminal belongs to one of communication cells provided by the wireless communication device. The wireless communication terminal is hereunder called simply a "terminal."

In connection with the LTE-A standard, introduction of a CoMP (Coordinated Multiple-Point transmission/reception) technique; namely, a plurality of wireless communication devices performing coordinated multiple-point communication for one terminal to thereby transmit a wireless signal to the terminal, is under consideration. Enhancement of a signal reception characteristic of a terminal can be expected, with the utilization of the CoMP technique.

FIG. 9 is a diagram showing an example of a JT (Joint Transmission) standard that is one of the CoMP techniques. As described in connection with Non-Patent Document 1, according to the JT standard, a terminal is connected to one wireless communication device and receives a signal transmitted from the wireless communication device in a downlink control channel (Physical Downlink Control Channel: PDCCH) domain. The terminal receives from a plurality of wireless communication devices a signal transmitted in a downlink shared channel (Physical Downlink Shared Channel: PDSCH) domain. Therefore, the plurality of wireless communication devices transmit identical data to the same resource block (Resource Block: RB) such that the data become in phase with each other. Accordingly, the terminal can combine radio waves transmitted from the plurality of wireless communication devices together, thereby enhancing receiving power.

FIG. 10 is a diagram showing an example of a DCS (Dynamic Cell Selection) standard that is one of the CoMP techniques. Even in the DCS standard, a terminal is connected to one wireless communication device and receives a signal transmitted in the PDCCH domain from the wireless communication device. The terminal receives the signal transmitted in the PDSCH domain from one of the plurality of wireless communication devices that coordinate with each other. As above, the wireless communication device in a superior receiving environment is selectively used from among the plurality of wireless communication devices, whereby the terminal can receive a signal in a much better receiving environment. Further, when one wireless communication device transmits data to the resource block (RB), another wireless communication device that coordinates with the wireless communication device perform muting (suspend transmission of radio waves) with respect to the RB, thereby reducing interference power. Incidentally, the invention is not restricted to the JT standard or the DOS standard.

RELATED ART DOCUMENTS

Non-Patent Documents

Non-Patent Document 1: 3GPP TS36.814 v9.0.0. "Evolved Universal Terrestrial Radio Access (E-UTRA); Further advancements for E-UTRA physical layer aspects"
Non-Patent Document 2: 3GPP TS36.213 v10.1.0, "Evolved Universal Terrestrial Radio Access (E-UTRA) Physical Layer procedures"

SUMMARY OF THE INVENTION

Problem that the Invention is to solve

The plurality of wireless communication devices used in the above-described CoMP techniques are; for instance, wireless communication base stations (ENB) capable of operating independently of each other. In this case, one of the plurality of wireless communication base stations operates as a master base station that intensively performs control operation, and the other wireless communication base stations work as slave base stations and operate in accordance with a command from the master base station. Necessary information is transferred from the master base station to the slave base station. The slave base stations may also be remote base stations (RRE: Remote Radio Equipment), such as outlying base stations that are connected directly to a central control base station that is to work as a master base station. In this respect, a connection between the master base station and the slave base station is predicated on a transmission line that entails a delay rather than on a high speed transmission line using an optical fiber.

In order to realize highly reliable communications with high reception quality, the organization 3GPP introduced parallel stop-and-wait (Parallel Stop-and-Wait) HARQ (Hybrid Automatic Repeat request). FIG. 11 is a chart showing a concept of the parallel stop-and-wait HARQ. In the HARQ communication, when a receiving side (a terminal) returns a NACK (Negative ACK) signal to a transmission side (a base station) as a result of having failed to receive data, the receiving side stores the unsuccessfully received data in a HARQ buffer rather than discarding it and will demodulate later the thus-stored data along with data that will be retransmitted from the transmission side later. According to a stop-and-wait ARQ protocol, the transmission side waits after sending one sub-frame until an ACK/NACK signal returns without sending the next packet. The word "sub-frame" means a unit time of scheduling. Further, stop-and-wait processing per sub-frame unit is hereinafter called a "HARQ process."

According to the parallel stop-and-wait standard, a plurality of HARQ processes are performed in parallel while being shifted from each other by one sub-frame. For this reason, the transmission side can carry out another HARQ process until an ACK/NACK signal pertinent to a certain HARQ process from the receiving side. As a consequence, deterioration of efficiency, which would otherwise be caused by suspending transmission until the transmission side receives the ACK/

NACK signal, can be avoided. In this regard, according to the 3GPP, eight HARQ processes are performed in parallel as suggested in connection with Non-Patent Document 2.

FIG. 12 is a timing chart obtained when the parallel stop-and-wait HARQ standard is applied to the communication that utilizes the CoMP technique. As shown in FIG. 12, when the parallel stop-and-wait HARQ standard is applied to the communication that utilizes the CoMP technique, there exists a "blank period" during which neither the master base station nor the slave base station can transmit data to the terminal. The blank period is a time from when the master base station receives an ACK/NACK signal from the terminal and transfers the next transmission data to the slave base station until when the slave base station receives the transmission data.

In order to enhance the signal reception characteristic of the terminal, all you need to do is to shorten the blank period. Since the blank period can be shortened by reducing a transmission delay existing between base stations, the minimum requirement is to connect the base stations by means of an optical fiber. However, when the base stations are interconnected with a line transmission channel or wireless communication other than the optical fiber, the blank period cannot be shortened in comparison with the case where the base stations are interconnected by means of the optical fiber. In order to enhance the signal reception characteristic of the terminal in such a situation, the essential requirement is to increase a data transmission quantity per sub-frame.

An object of the invention is to provide a wireless communication device, a wireless communication terminal, and an automatic repeat request control method that enable enhancement of a signal reception characteristic of a wireless communication terminal employed in a communication system that utilizes a coordinated multiple-point technique.

According to one aspect of the invention, there is provided a wireless communication device used in a communication system configured to utilize a coordinated multiple-point technique, the device including:

a coordinated multiple-point base station determination section configured to determine another wireless communication device which performs, together with the wireless communication device of interest, multiple-point coordinate with respect to a wireless communication terminal;

an allocation determination section configured to determine for a predetermined number of sub-frames a proportion of multiple-data-transmission automatic repeat request control to identical-data-transmission automatic repeat request control;

a first automatic repeat request control section configured to perform the multiple-data-transmission automatic repeat request control; and a second automatic repeat request control section configured to perform the identical-data-transmission automatic repeat request control.

According to another aspect of the invention, there is provided an automatic repeat request control method to be practiced by a wireless communication device used in a communication system configured to utilize a coordinated multiple-point technique, the method including:

determining another wireless communication device configured to perform, with the wireless communication device, coordinated multiple-point with respect to a wireless communication terminal;

determining for a predetermined number of sub-frames a proportion of multiple-data-transmission automatic repeat request control to identical-data-transmission automatic repeat request control; and performing on a per-sub-frame basis multiple-data-transmission automatic repeat request control or identical-data-transmission automatic repeat request control according to the determined allocation.

According to still another aspect of the invention, there is provided a wireless communication terminal configured to make communications with a wireless communication device utilizing a coordinated multiple-point technique, the terminal including:

a receiving section configured to receive from the wireless communication device control information including a command to perform for a predetermined sub-frame multiple-data-transmission automatic repeat request control or identical-data-transmission automatic repeat request control; and an automatic repeat request control section configured to perform automatic repeat request control for the sub-frame according to the received control information.

According to still another aspect of the present invention, there is provided an automatic repeat request control method to be practiced by a wireless communication terminal configured to make communications with a wireless communication device utilizing a coordinated multiple-point technique, the method including:

receiving from the wireless communication device control information including a command to perform for a predetermined sub-frame multiple-data-transmission automatic repeat request control or identical-data-transmission automatic repeat request control; and performing automatic repeat request control for the sub-frame according to the received control information.

Advantage of the Invention

The wireless communication device, the wireless communication terminal, and the automatic repeat request control method of the invention enable enhancement of a signal reception characteristic of a wireless communication terminal employed in a communication system that utilizes a coordinated multiple-point technique.

BRIEF DESCRIPTION OF THE DRAWINGS

FIG. 3 is a drawing showing a table used when the master base station determines allocation of HARQ control to eight sub-frames.

EMBODIMENT FOR IMPLEMENTING THE INVENTION

An embodiment of a communication system of the invention is directed to a system that applies parallel stop-and-wait HARQ to communications utilizing a CoMP technique. In order to increase a throughput between a base station and a terminal, the essential requirement for the system is to increase the number of HARQ processes. However, the volume of a HAQR buffer of the base station and the volume of a HARQ buffer of the terminal also augment in proportion to an increase in the number of HARQ processes. Augmentation of the volume of HARQ buffer results in undesired consumption of limited memory resources.

Figure 12:
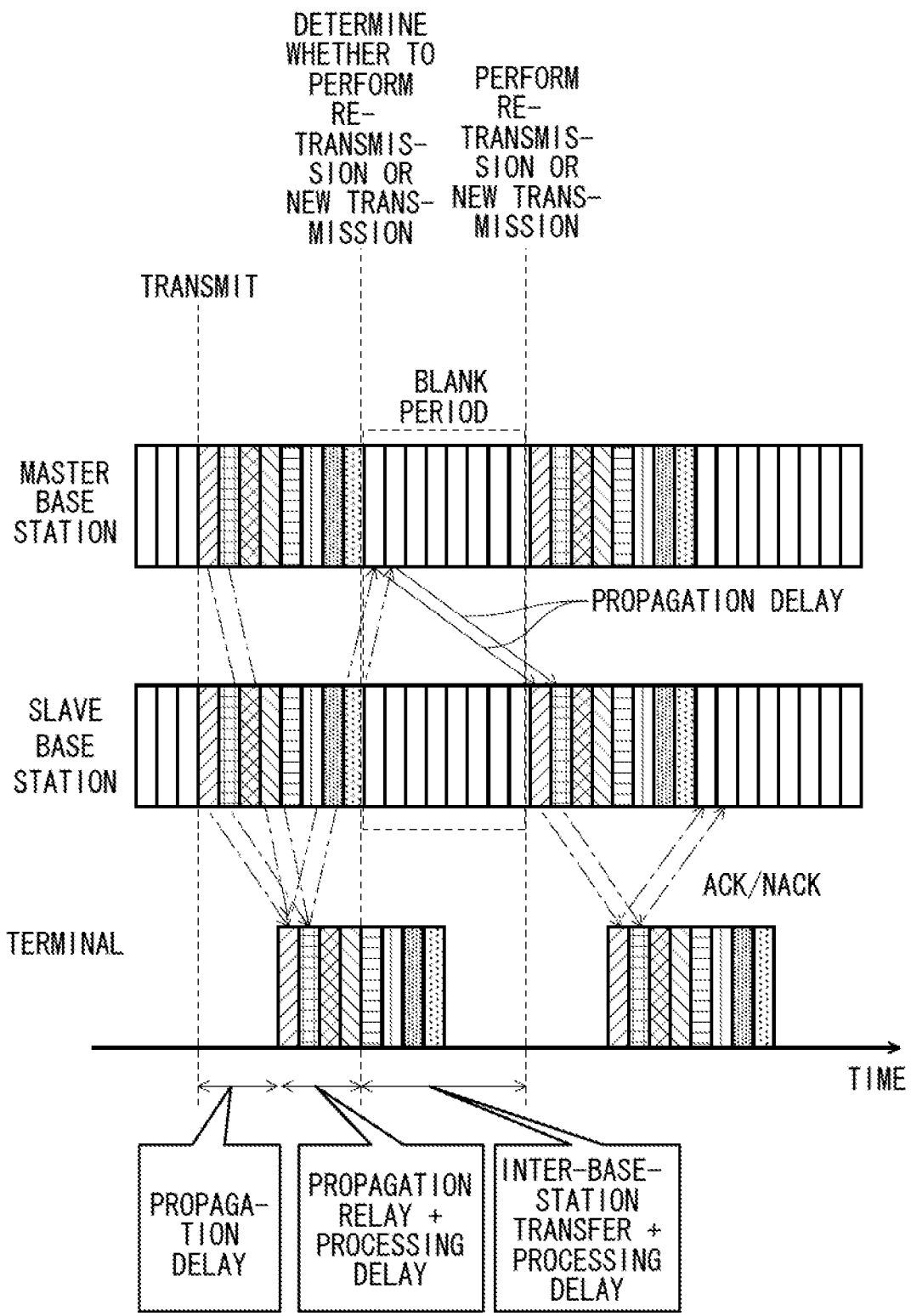
FIG. 12 is a timing chart obtained when the parallel stop-and-wait HARQ is applied to communications that utilize the CoMP technique.

Further, on the assumption that the number of HARQ processes per base station is constant (HARQ processes are eight in the example shown in FIG. 12), a terminal can utilize HARQ processes determined by the following equation in a system utilizing the CoMP technique; namely, "the number of base stations to be utilized×the number of HARQ processes per base station=a total number of HARQ processes." However, under circumstances where a suffice throughput between the base station and the terminal is achieved without use of the CoMP technique, providing resources tantamount to the total number of HARQ processes sometimes becomes excessive.

The communication system of the embodiment to be described below has a configuration that takes into account the circumstances. The terminal which makes up the communication system can utilize a MIMO (Multiple Input Multiple Output) technique that broadens a band for exchanging data by combination of a plurality of antennas.

Figure 1:
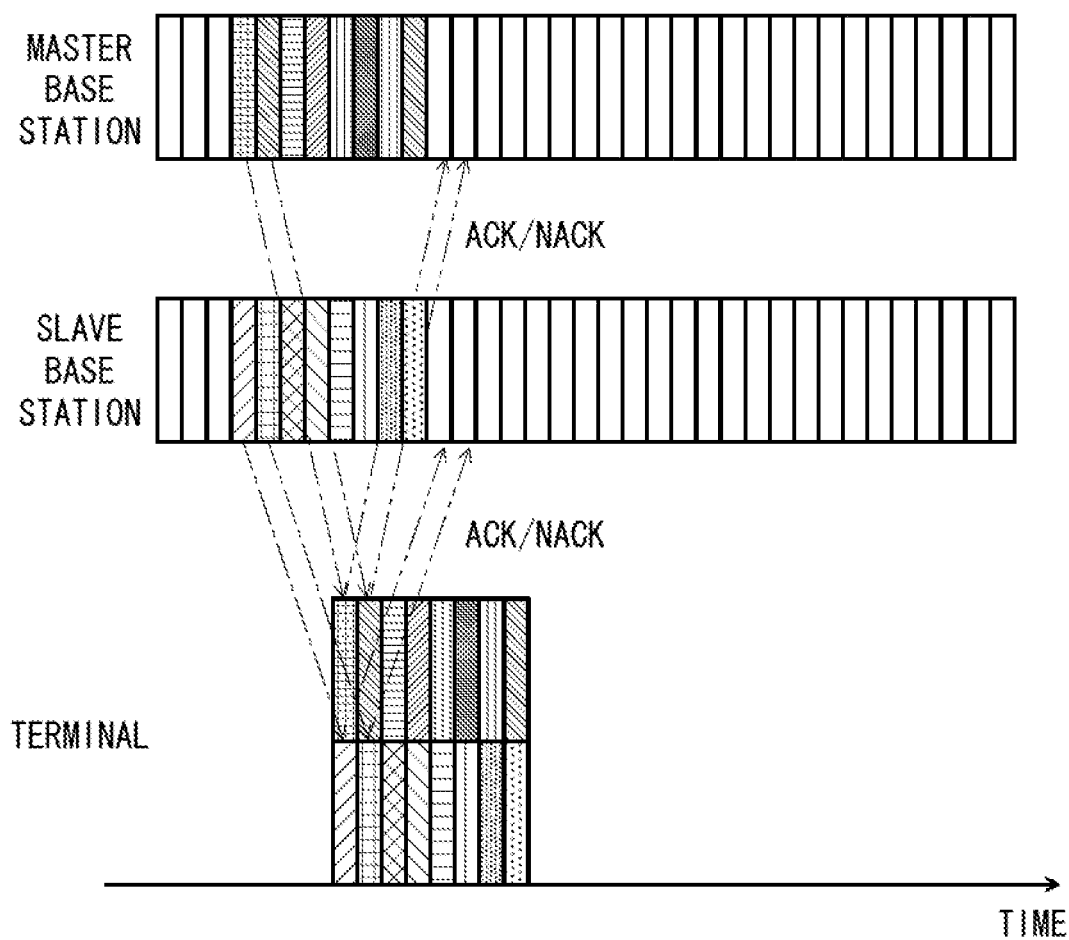
FIG. 1 is a timing chart showing multiple data transmission HARQ control in which a master base station and a slave base station respectively transmit different data to a terminal from by use of the same sub-frame.

FIG. 1 is a timing chart showing multiple data transmission HARQ control in which the master base station and the slave base station respectively transmit different data to the terminal by use of the same sub-frame. In the multiple data transmission HARQ control shown in FIG. 1, the master base station and the slave base station respectively transmit different sets of data to the terminal; hence, HARQ processes are also separately set. Under HARQ control of this mode, since a plurality of base stations transmit different sets of data to one terminal, and hence a high throughput can be achieved. However, since the number of HARQ process per sub-frame is plural, high-capacity HARQ buffer becomes necessitated. In the example, the master base station and the slave base stations transmit PDCCH signals with different specifics as control channels to be transmitted by means of a downlink. Moreover, the terminal returns an ACK/NACK signal to each of the base stations.

Figure 2:
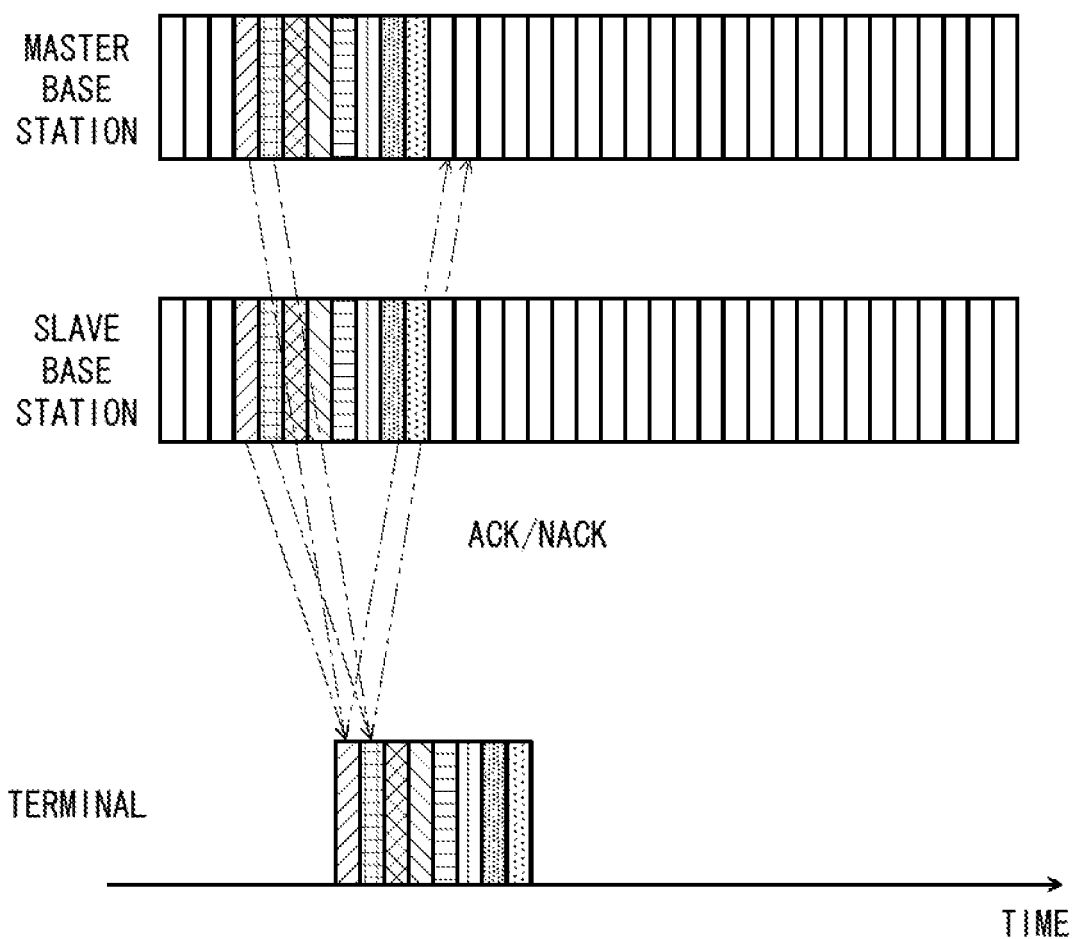
FIG. 2 is a timing chart showing identical data transmission HARQ control in which the master base station and the slave base station transmit identical data to the terminal from by use of the same sub-frame.

FIG. 2 is a timing chart showing identical data transmission HARQ control in which the master base station and the slave base station transmit the identical data to the terminal by use of the same sub-frame. Under the identical data transmission HARQ control shown in FIG. 2, the master base station and the slave base station transmits the identical data to the terminal, and hence HARQ processes are commonly set. Under the HARQ control of this mode, the identical data are transmitted to one terminal from a plurality of base stations, and hence the number of HARQ processes per sub-frame is one. To be specific, compared to the example shown in FIG. 1, an increase in the number of HARQ processes can be inhibited. In this respect, however, an improvement in throughput cannot be expected. In the example, only the master base station transmits a PDCCH signal to the terminal. Moreover, the terminal returns an ACK/NACK signal only to the master base station.

The base stations which make up the communication system of the embodiment performs any one of two types of HARQ control on a per-sub-frame basis according to a length of a time of a transmission delay existing between the base stations. Therefore, when the maximum number of sub-frames that one base station can process through parallel-processing by shifting the sub-frames from each other by one, a total number of HARQ processes that can be performed by the eight sub-frames is 8 to 16. In the embodiment, when the time of a transmission delay existing between the base stations is long, identical data transmission HARQ control shown in FIG. 2 and multiple data transmission HARQ control shown in FIG. 1 are allocated to the eight sub-frames such that the proportion of identical data transmission HARQ control becomes larger than the proportion of multiple data transmission HARQ control. In the meantime, when the time of a transmission delay existing between the base stations is short, the multiple data transmission HARQ control shown in FIG. 1 and the identical data transmission HARQ control shown in FIG. 2 are allocated to the eight sub-frames such that the proportion of the multiple data transmission HARQ control becomes larger than the proportion of the identical data transmission HARQ control. As a consequence, in the former case, since the total number of HARQ processes becomes smaller, an increase in the number of HARQ processes can be inhibited. In contrast, in the latter case, since the total number of HARQ processes becomes greater, a throughput can be increased.

The master base station of the embodiment determines, from the time of a transmission delay existing between the base stations, a proportion of multiple data transmission HARQ control to be performed for eight sub-frames and a proportion of identical data transmission HARQ control to be performed for the eight sub-frames. Specifically, the master base station determines a proportion of multiple data transmission HARQ control to identical data transmission HARQ control (hereinafter called an "HARQ control allocation") for eight sub-frames. FIG. 3 is a table used when the master base station determines a HARQ control allocation for eight sub-frames. Determination of a HARQ control allocation performed by the master base station corresponds to determination of the maximum number of processes (Nmmax) performed through the multiple data transmission HARQ control shown in FIG. 3.

Figure 4:
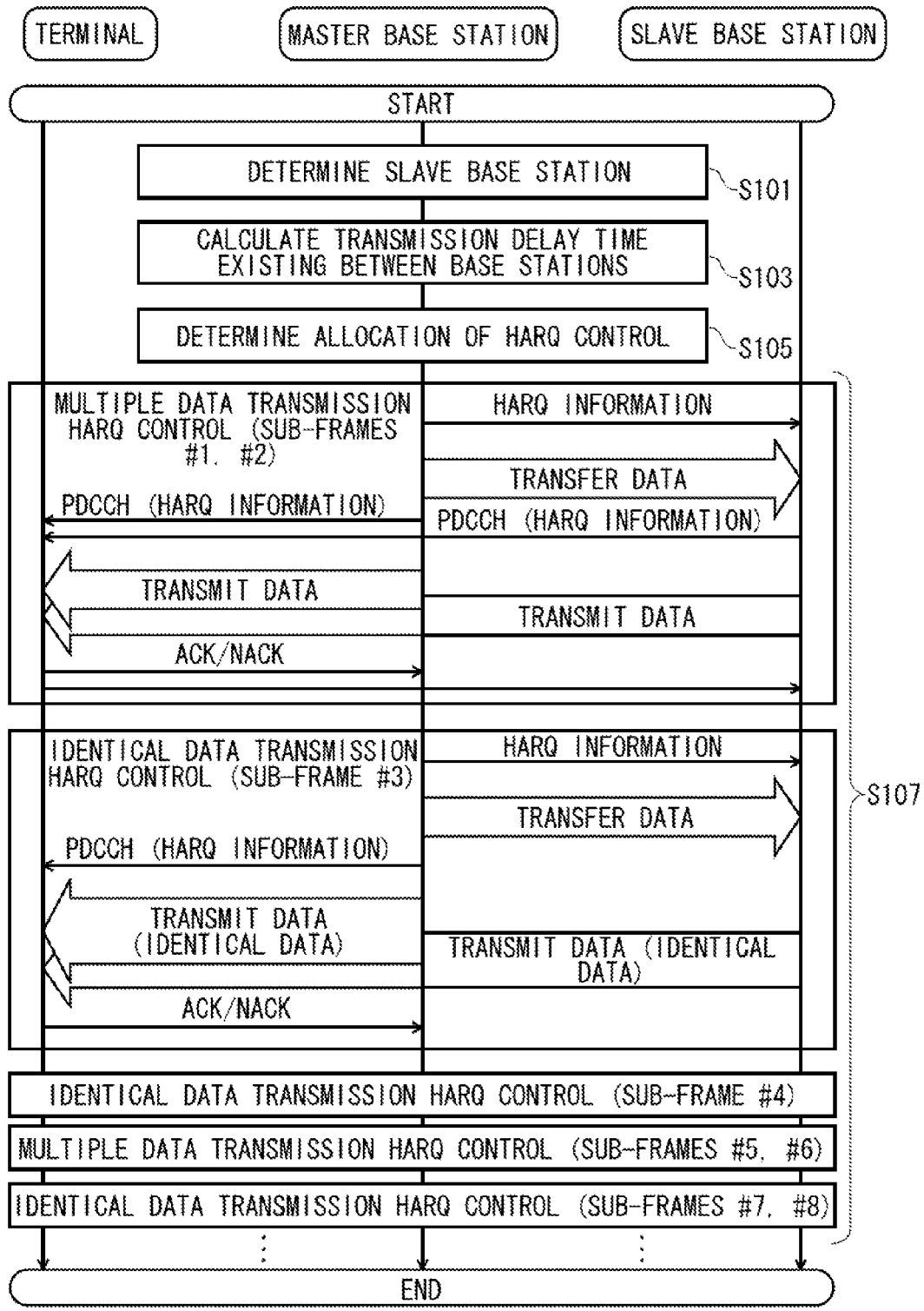
FIG. 4 is a sequence diagram of entire HARQ control performed when the terminal, the master base station, and the slave base station which make up a communication system perform CoMP communications.

FIG. 4 is a sequence diagram of entire HARQ control performed when the terminal, the master base station, and the slave base stations which make up of the communication system perform CoMP communications. As shown in FIG. 4, when commencing CoMP communications, the master base station determines, from a reception quality report message transmitted from terminal, a slave base station capable of making a CoMP communication (step S101). Next, the master base station carries out signaling with respect to the thus-determined slave base station, and calculates from a result a transmission delay time existing between the master base station and the slave base station (step S103).

Next, the master base station determines, from the transmission delay time calculated in step S103, a proportion of multiple data transmission HARQ control to identical data transmission HARQ control for eight sub-frames (a HARQ control allocation), deriving from the table shown in FIG. 3 the maximum number of processes (Nmmax) used in multiple data transmission HARQ control (step S105). Subsequently, multiple data transmission HARQ control or identical data transmission HARQ control is performed, on the basis of the HARQ control allocation determined in steps S1 to S5, in sequence for each of the eight sub-frames (#1 to #8) (step S107). In the example shown in FIG. 4, multiple data transmission HARQ control is performed for sub-frames #1, #2, #5, and #6, whereas identical data transmission HARQ control is performed for sub-frames #3, #4, #7, and #8.

Under the multiple data transmission HARQ control, the master base station first transmits HARQ information to the slave base station by means of X2 signaling. Next, the master base station transfers to the slave base station data to be transmitted to the terminal. Subsequently, the master base station and the slave base station transmit the HARQ information to the terminal by means of respective different PDCCH signals. Further, the master base station and the slave base station transmit different sets of data to the terminal.

The terminal receives each of the different PDCCH signals transmitted from the master base station and the slave base station. On the basis of the HARQ information included in each of the received PDCCH signals, multiple data receiving HARQ control is performed for a predetermined sub-frame. Finally, on the basis of reception results pertinent to the sets of data received from the master base station and the slave base station, the terminal transmits ACK/NACK signals to the respective base stations.

Under identical data transmission HARQ control, the master base station first transmits HARQ information to the slave base station by means of X2 signaling. Next, the master base station transfers to the slave base station data which will be transmitted to the terminal by the slave base station. Only the master base station then transmits the HARQ information to the terminal by means of the terminal PDCCH signal. Subsequently, the master base station and the slave base station respectively transmit the identical data to the terminal.

The terminal receives the PDCCH signal transmitted from the master base station and performs identical data receiving HARQ control for a predetermined sub-frame on the basis of HARQ information included in the received PDCCH signal. Finally, the terminal transmits an ACK/NACK signal only to the master base station on the basis of reception results pertinent to the sets of data received from the master base station and the slave base station.

Figure 5:
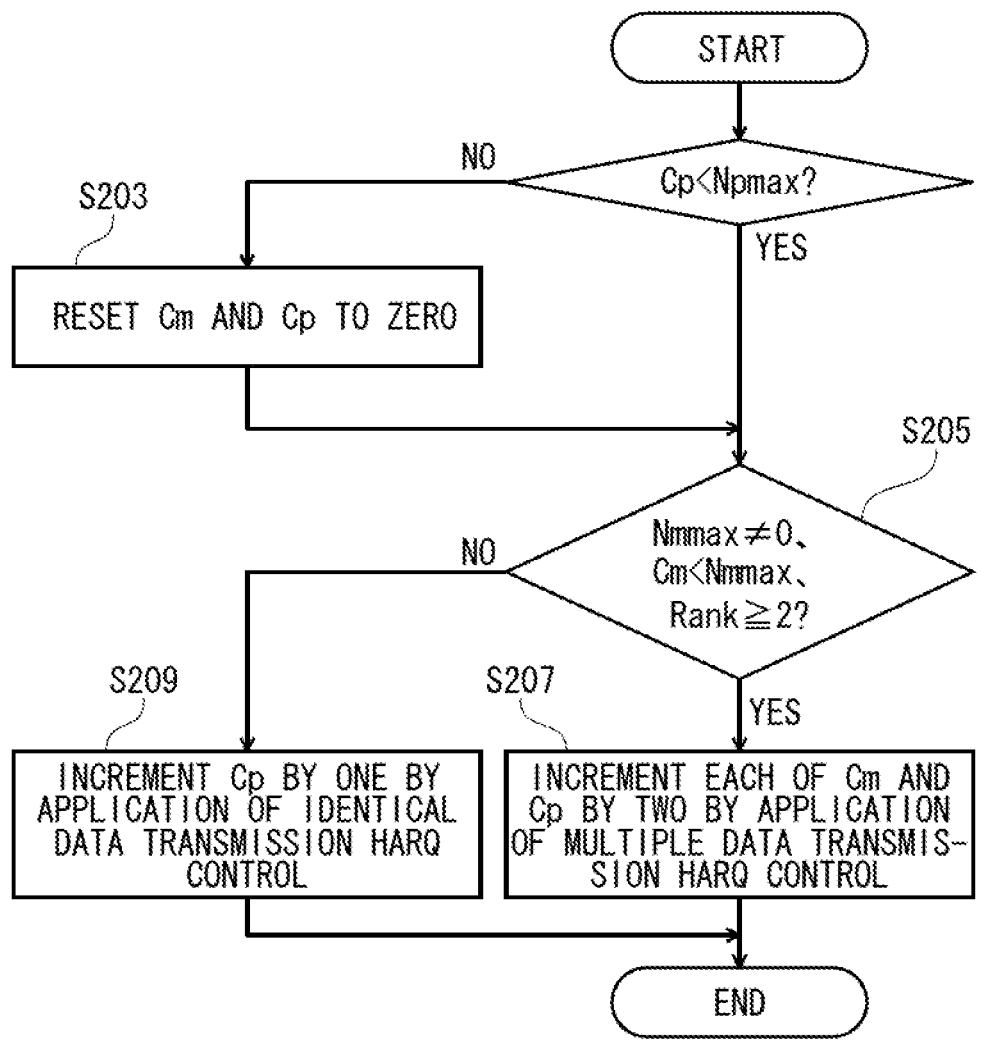
FIG. 5 is a flowchart showing processing to be performed by the master base station when HARQ control is performed for each sub-frame.

The master base station performs processing shown in FIG. 5 on a per-sub-frame basis when performing the foregoing HARQ control for each of the sub-frames. FIG. 5 is a flowchart showing processing that the master base station performs when practicing HARQ control for each sub-frame. As shown in FIG. 5, the master base station determines whether or not a count value $Cp$ pertinent to the number of HARQ processes used in HARQ control falls short of the maximum allowable number of processes Npmax ($Cp<Npmax$) (step S201). In relation to the parallel stop-and-wait HARQ that practices the eight HARQ processes by means of parallel processing, when CoMP communication is performed by use of the two base stations, the master base station determines whether or not a relationship of $Cp<16$ stands. When a relationship of $Cp$ Npmax stands, the master base station resets a count value $Cp$ pertinent to the number of HARQ processes and a count value $Cm$ pertinent to the number of HARQ processes used in multiple data transmission HARQ control to zero (step S203), proceeding to step S205. In the meantime, when a relationship of $Cp<Npmax$ stands, the master base station proceeds to step S205.

In step S205, the master base station determines whether the maximum number of processes used in the multiple data transmission HARQ control determined in S105 is not zero (Nmmax≠0); whether or not the counter value $Cm$ pertinent to the number of processes used in multiple data transmission HARQ control falls short of Nmmax ($Cm<Nmmax$); and whether or not reception quality of the terminal satisfies reception quality appropriate for transmission of a plurality of sets of data. The reception quality of the terminal is represented by the number of layers (Rank) that can be subjected to spatial multiplexing; namely, the number of paths. The master base station proceeds to step S207, so long as all the requirements (Nmmax≠0, Cm<Nmmax, Rank≥2) described in connection with step S205 are fulfilled. If at least one of the requirements is not fulfilled, the master base station proceeds to step S209.

In step S207, the master base station allocates different HARQ processes respectively to the master base station and the slave base station by application of multiple data transmission HARQ control, incrementing $Cm$ and $Cp$ by two. In the meantime, in step S209 the master base station allocates the identical HARQ process to the master base station and the slave base station by application of identical data transmission HARQ control, incrementing $Cp$ by one. Incidentally, regardless of which HARQ control is applied, the master base station notifies HARQ information to the slave base station by use of an X2 interface. The HARQ information includes information; for instance, an ID and a redundancy version of an HARQ process.

An existing PDCCH signal for transmitting control information to be notified to the terminal from the base station includes only a notification area commensurate with eight processes (three bits). Therefore, in the embodiment, a total of 16 processes can be identified by addition of one-bit sub-process notification bit. In the case of multiple data transmission HARQ control, control information is transmitted not only by the master base station but also by the slave base station through use of the PDCCH signal. Here, an uplink transmission power control bit region (two bits) included in the PDCCH signal from the slave base station is unnecessary, because there is used a value common to information that the master base station transmits by means of the PDCCH signal. Therefore, the bit region may also be set to the above-described one-bit sub-processor notification bit.

Figure 6:
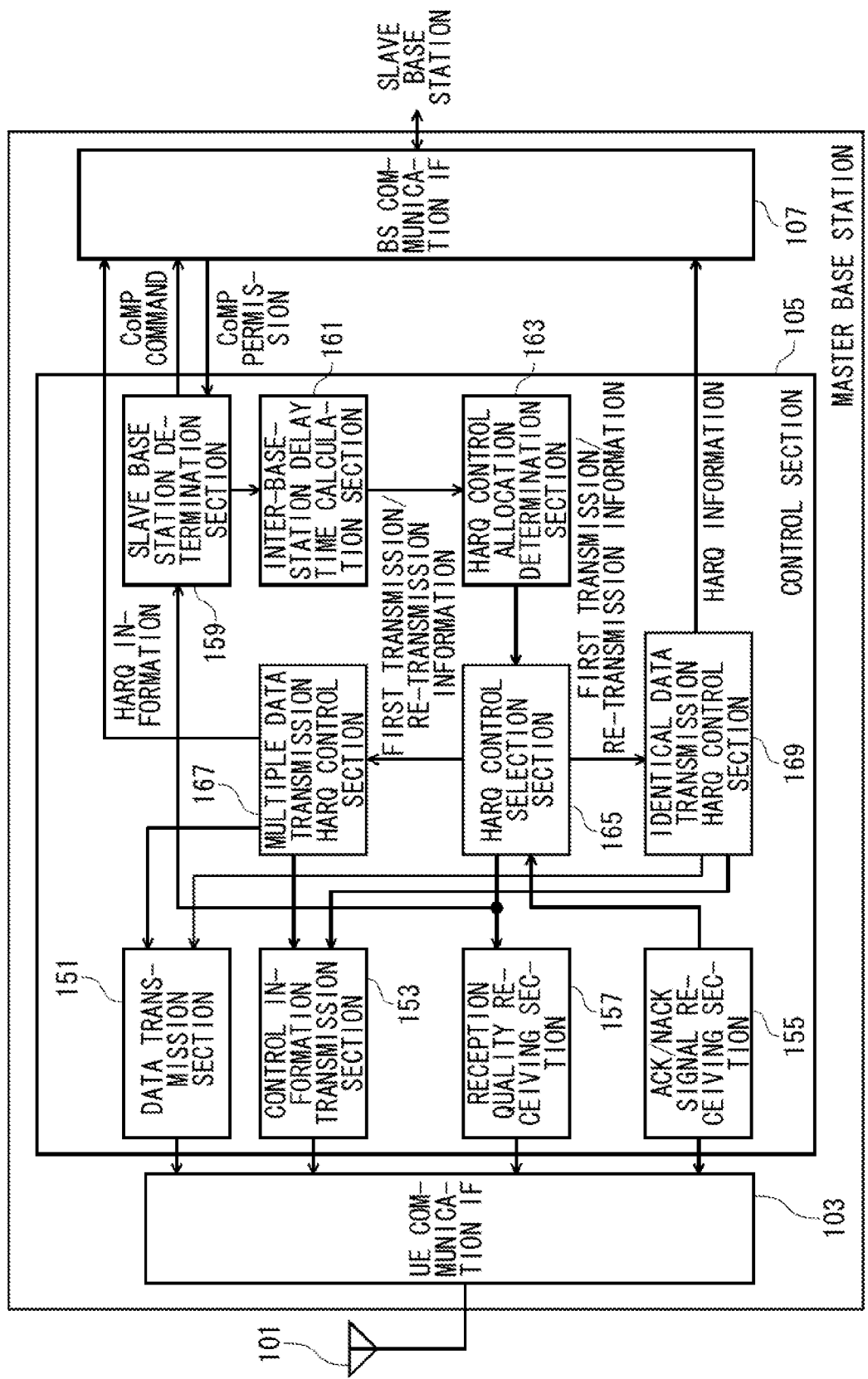
FIG. 6 is a block diagram showing an internal configuration of the master base station which makes up the communication system.

FIG. 6 is a block diagram showing an internal configuration of the master base station that makes up the communication system of the embodiment. As shown in FIG. 6, the master base station includes an antenna 101, a UE communication IF 103, a control section 105, and a BS communication IF 107. The UE communication IF 103 is an interface for establishing wireless communications with the terminal by use of the antenna 101. The control section 105 controls operation of the master base station. The BS communication IF 107 is an interface for establishing a communication with the slave base station connected to the BS communication IF 107 by way of a line transmission channel.

The control section 105 has a data transmission section 151, a control information transmission section 153, an ACK/NACK signal receiving section 155, a reception quality receiving section 157, a slave base station determination section 159, an inter-base-station delay time calculation section 161, a HARQ control allocation determination section 163, a HARQ control selection section 165, a multiple data transmission HARQ control section 167, and an identical data transmission HARQ control section 169.

The data transmission section 151 transmits data except the control information to the terminal. The control information transmission section 153 transmits HARQ information to the terminal by means of the PDCCH signal. The ACK/NACK signal receiving section 155 receives an ACK/NACK signal transmitted from the terminal. The reception quality receiving section 157 receives a reception quality report message transmitted from the terminal.

The slave base station determination section 159 determines, from the reception quality indicated by the reception quality report messages received by the reception quality receiving section 157, a slave base station capable of performing CoMP communications (step S101 shown in FIG. 4). The slave base station determination section 159 transmits a CoMP command to the thus-determined slave base station by way of the BS communication IF 107 and receives a CoMP permission signal sent from the slave base station. The inter-base-station delay time calculation section 161 calculates an inter-base-station transmission delay time from a result of signaling that the slave base station determination section 159 has performed with respect to the slave base station (step S103 shown in FIG. 4).

The HARQ control allocation determination section 163 determines, from the transmission delay time determined by the inter-base-station delay time calculation section 161, a proportion of multiple data transmission HARQ control to identical data transmission HARQ control for eight sub-frames (i.e., a HARQ control allocation) (step S105 shown in FIG. 4). According to the HARQ control allocation determined by the HARQ control allocation determination section 163 and the reception quality of the terminal, the HARQ control selection section 165 selects, on a per-sub-frame basis, whether to select the multiple data transmission HARQ control or the identical data transmission HARQ control (steps S201 to S205 shown in FIG. 5).

The multiple data transmission HARQ control section 167 performs multiple data transmission HARQ control (step S107 shown in FIG. 4 and step S207 shown in FIG. 5). The identical data transmission HARQ control section 169 performs identical data transmission HARQ control (step S107 shown in FIG. 4 and step S209 shown in FIG. 5). The multiple data transmission HARQ control section 167 and the identical data transmission HARQ control section 169 transmit HARQ information to the slave base station by way of the BS communication IF section 107.

Figure 7:
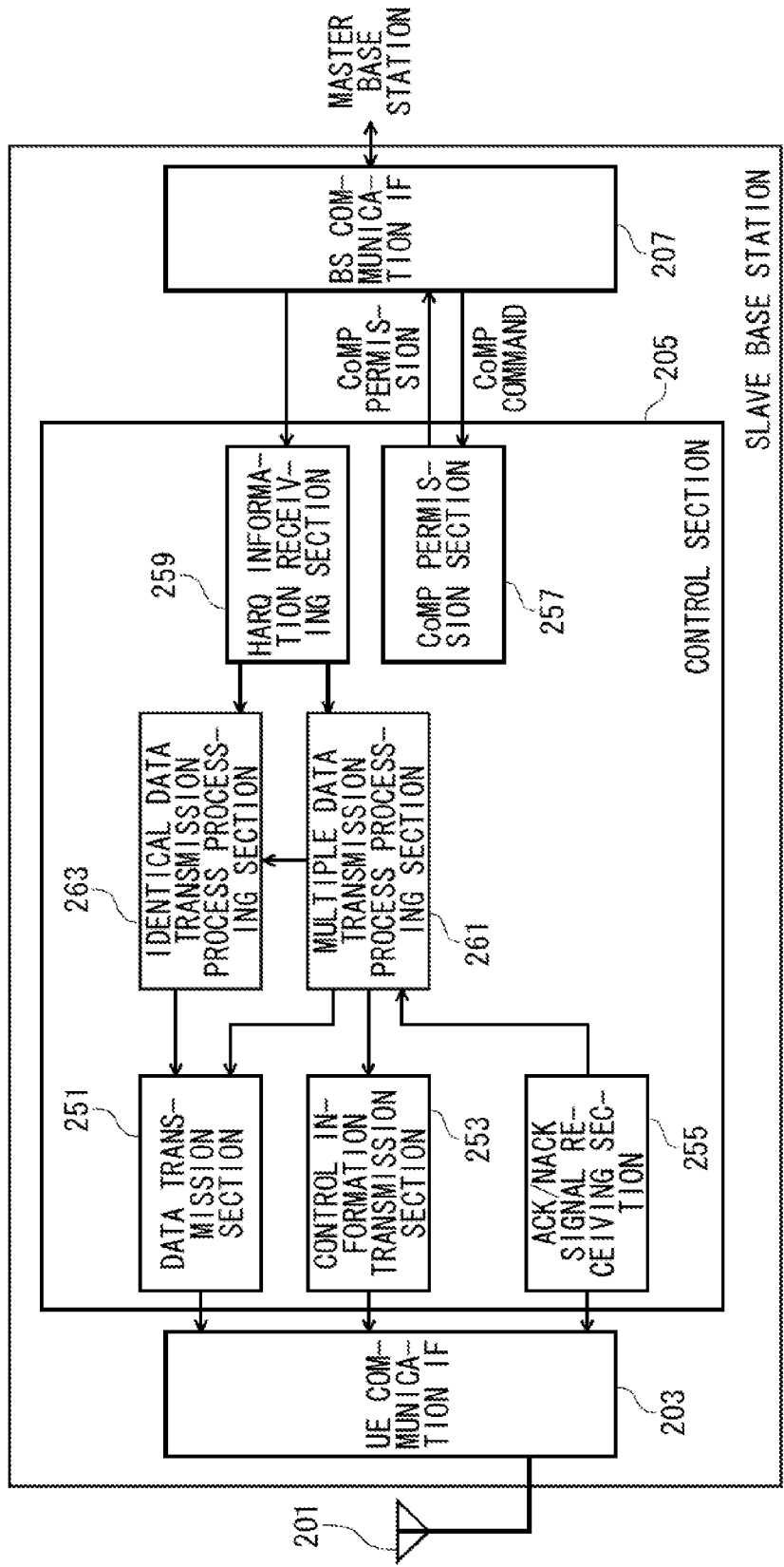
FIG. 7 is a block diagram showing an internal configuration of the slave base station which makes up the communication system.

FIG. 7 is a block diagram showing an internal configuration of the slave base station that makes up the communication system. As shown in FIG. 7, the slave base station has an antenna 201, an UE communication IF 203, a control section 205, and a BS communication IF 207. The UE communication IF 203 is an interface for making wireless communications with the terminal by use of the antenna 201. The control section 205 controls operation of the slave base station. The BS communication IF 207 is an interface for making communications with the master base station connected to the BS communication IF 207 by way of the line transmission channel.

The control section 205 has a data transmission section 251, a control information transmission section 253, an ACK/NACK signal receiving section 255, a CoMP permission section 257, a HARQ information receiving section 259, a multiple data transmission process processing section 261, and an identical data transmission process processing section 263.

The data transmission section 251 transmits data except control information to the terminal. The control information transmission section 253 transmits the HARQ information to the terminal by means of a PDCCH signal. The CoMP permission section 257 receives the CoMP command transmitted from the master base station by way of the BS communication IF 207, transmitting a CoMP permission to the master base station. The HARQ information receiving section 259 receives the HARQ information transmitted from the master base station, transmitting the thus-received HARQ information to the multiple data transmission process processing section 261 or the identical data transmission process processing section 263 on a per-sub-frame basis (step S107 shown in FIG. 4). The multiple data transmission process processing section 261 performs multiple data transmission HARQ control (step S107 shown in FIG. 4). The identical data transmission process processing section 263 performs identical data transmission HARQ control (step S107 shown in FIG. 4).

As described above, in the embodiment, the master base station determines, from a transmission delay time existing between the master base station and the slave base station, a proportion of multiple data transmission HARQ control to identical data transmission HARQ control for eight sub-frames (i.e., a HARQ control allocation). Further, the master base station selects either multiple data transmission HARQ control or identical data transmission HARQ control, on a per-sub-frame basis, according to information based on the HARQ control allocation (i.e., the maximum number of processes Nmmax used in multiple data transmission HARQ control) and the reception quality (RANK) of the terminal. The master base station and the slave base station performs the thus-selected HARQ control.

As above, the number of HARQ processes used between the terminal and the base station is optimally controlled according to the transmission delay time existing between the base stations that affects the length of the blank period; hence, a signal reception characteristic of the terminal can be enhanced. To be specific, deterioration of a throughput between the terminal and the base station, which would otherwise occur in the blank period during which neither the master base station nor the slave base station can transmit data to the terminal, can be prevented.

Figure 8:
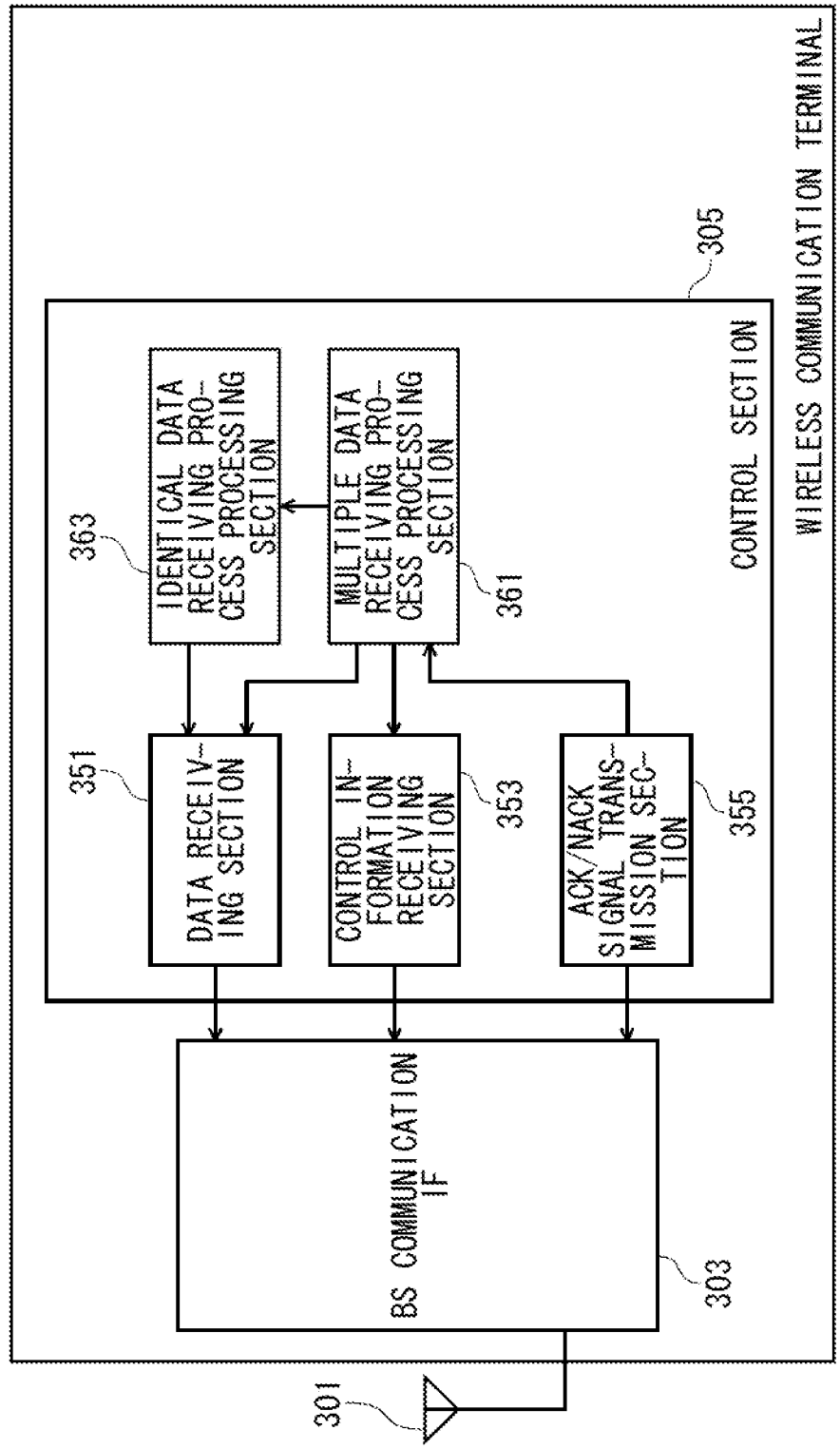
FIG. 8 is a block diagram showing an internal configuration of the wireless communication terminal that makes communications with the master base station and the slave base station.
Figure 9:
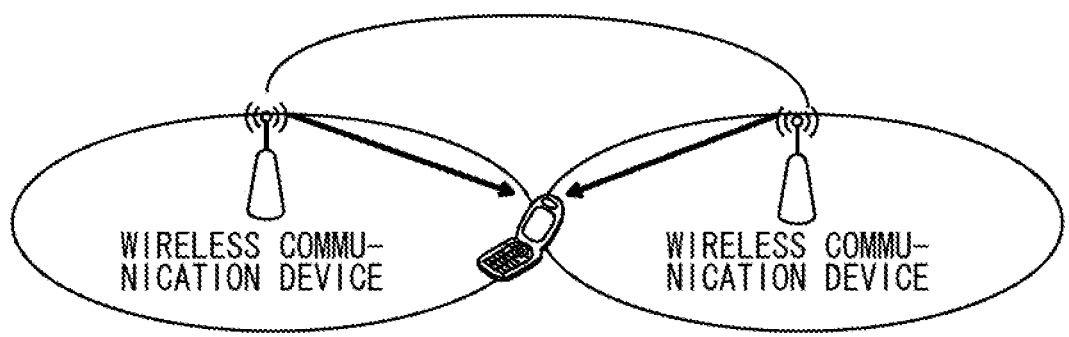
FIG. 9 is a drawing showing an example of a (Joint Transmission) standard that is one of CoMP techniques.
Figure 10:
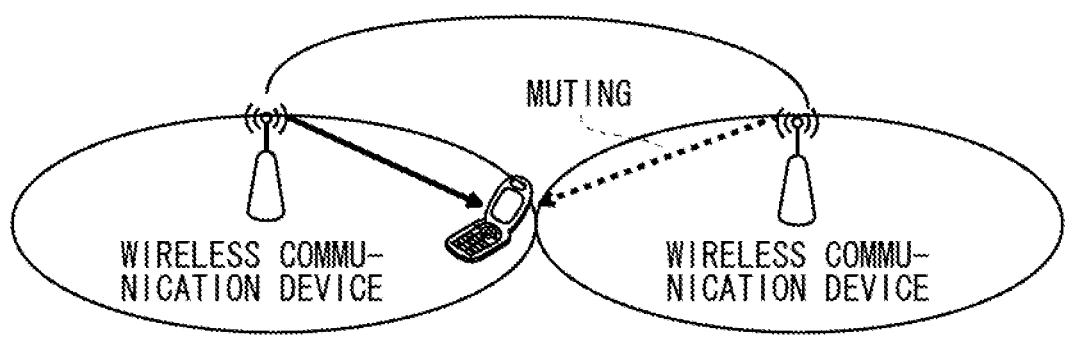
FIG. 10 is a diagram showing an example of a DCS (Dynamic Cell Selection) standard that is one of the CoMP techniques.
Figure 11:
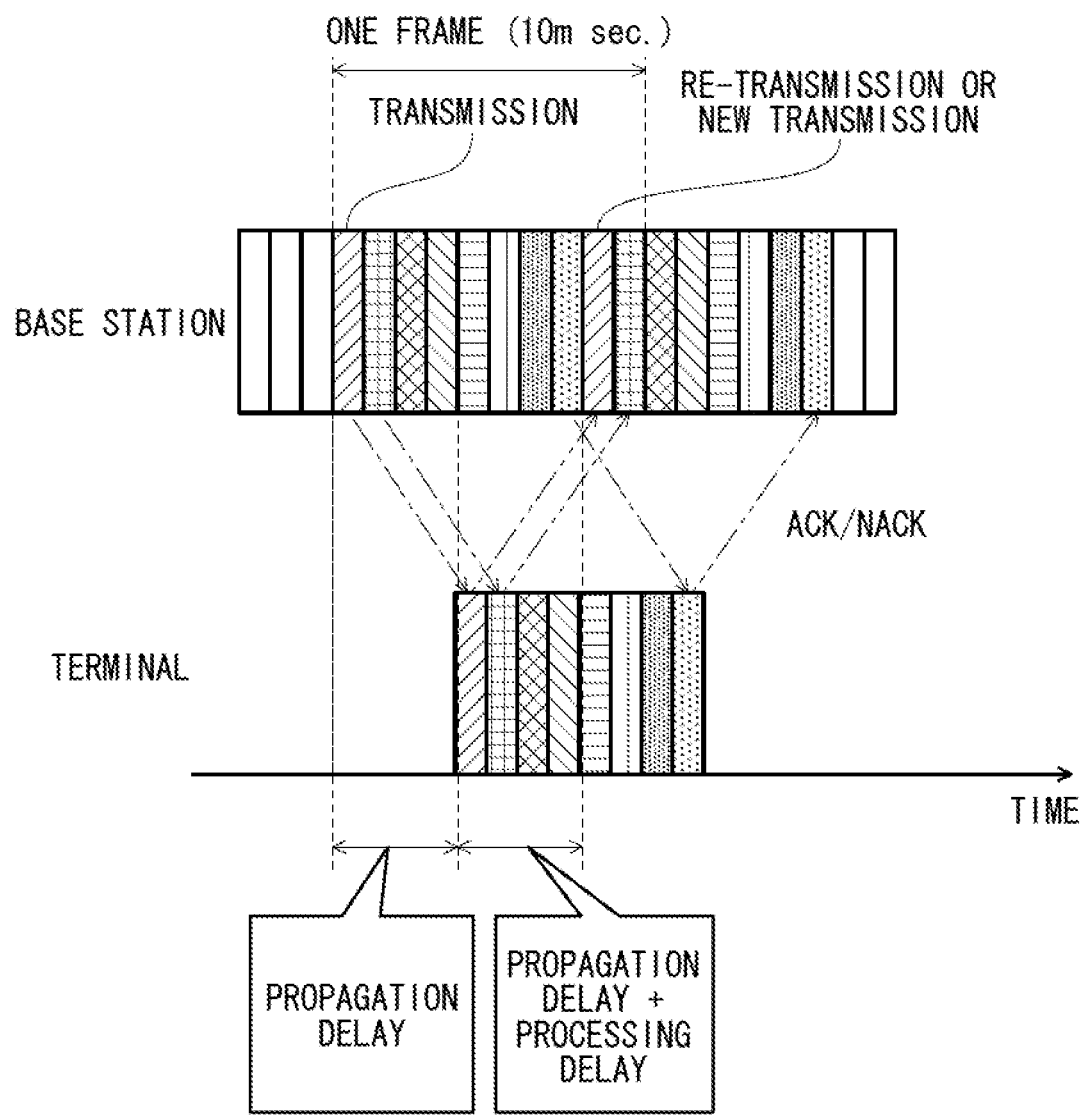
FIG. 11 is a chart showing a concept of parallel stop-and-wait HARQ.

FIG. 8 is a block diagram showing an internal configuration of the wireless communication terminal that establishes a communication with the master base station and the slave base station. As shown in FIG. 8, the wireless communication terminal is equipped with an antenna 301, a BS communication IF 303, and a control section 305. The BS communication IF 303 is an interface for making wireless communications with the base station by use of the antenna 301.

The control section 305 has a data receiving section 351, a control information receiving section 353, an ACK/NACK transmission section 355, a multiple data receiving process processing section 361, and an identical data receiving process processing section 363.

The data receiving section 351 receives data except the control information from the base stations. The control information receiving section 353 receives from the base stations HARQ information included in the PDCCH signal. The ACK/NACK transmission section 355 transmits an ACK/NACK signal to the base stations. The multiple data receiving process processing section 361 performs multiple data receiving HARQ control for a predetermined sub-frame. The identical data process processing section 363 performs identical data receiving HARQ control for a predetermined sub-frame.

As has been described by reference to FIG. 1 or FIG. 4, in the embodiment, the PDCCH signal that serves as a control channel to be transmitted in a downlink is transmitted separately to the master base station and the slave base station under multiple data transmission HARQ control. Therefore, an uplink transmission resource ACK/NACK is commanded separately by means of the respective PDCCH signals. As a consequence, control must be performed so as to avoid occurrence of an overlap between the ACK/NACK transmission resource delivered from the terminal to the master base station and the ACK/NACK transmission resource delivered from the terminal to the slave terminal. The embodiment implements any one of two methods for performing control in order to avoid occurrence of an overlap between the ACK/NACK transmission resources by coordination of the base stations. The two methods are described hereunder.

According to a first method, on the occasion of the HARQ information being transmitted form the maser base station to the slave base station, the slave base station is notified of an ACK/NACK transmission resource responsive to the data transmitted from the master base station. According to the method, the slave base station can avoid the ACK/NACK transmission resource for the master base station and schedule the ACK/NACK transmission resource responsive to the data transmitted from the slave base station. According to a second method, the master base station schedules the ACK/NACK transmission resource responsive to the data transmitted from the slave base station. In this case, the master base station determines an ACK/NACK transmission resource responsive to the data transmitted from the slave base station, notifying the transmission slave to the slave base station.

Further, even under multiple data transmission HARQ control, when only the master base station has transmitted the PDCCH signal to the terminal, the ACK/NACK signal responsive to the data transmitted from the master base station and the ACK/NACK signal responsive to the data transmitted from the slave base station are simultaneously transmitted as in the case of identical data transmission HARQ control, and only the master base station receives the ACK/NACK signal. Specifically, the ACK/NACK signal that the master base station commands by means of the PDCCH signal also includes the ACK/NACK signal responsive to the data transmitted from the slave base station.

Each of the base stations can properly receive the ACK/NACK signal without an overlap between the ACK/NACK transmission resource responsive to the data transmitted from the master base station and the ACK/NACK transmission resource responsive to the data transmitted from the slave base station.

Although the invention has been described in connection with each of the embodiments by taking as an example a case where the invention is implemented by means of hardware, the invention can also be implemented by means of software in conjunction with hardware.

Each of the functional blocks is realized typically as an LSI that is an integrated circuit. Each of the functional blocks can be embodied as a single chip, or some or all of the functional blocks can also be embodied as a single chip. Although the functional blocks are referred to as an LSI in the specification, the integrated circuit may also often called an IC, a system LSI, a super LSI, or an ultra LSI.

A technique of embodying an integrated circuit is not limited to the LSI and can also be realized by use of a custom-designed circuit or a general-purpose processor. There may also be utilized an FPGA (Field Programmable Gate Array) that enables programming of an LSI after manufacture of the LSI or a reconfigurable processor in which interconnections or settings of circuit cells in an LSI can be reconfigured.

Furthermore, if an integrated circuit technique, which will be a replacement for an LSI, advents as a result of progression of the semiconductor techniques or by virtue of another derivative technique, the functional blocks can naturally be integrated by use of the technique. Application of biotechnology is feasible.

Explanations have been given in the embodiments by adoption of the antenna. However, the invention can also be applied likewise even by use of an antenna port. The word "antenna port" designates a logic antenna made up of one or a plurality of physical antennas. To be specific, the antenna port does not always mean one physical antenna and often designates an arrayed antenna made up of a plurality of antennas. For instance, LTE (Long Term Evolution) provides no specifications about the number of physical antennas that make up an antenna port. A base station is specified as a minimum unit capable of transmitting a different reference signal (Reference signal). Further, the antenna port can sometimes be specified as a minimum unit that performs multiplication of a weight on a precoding vector.

While the present invention has been described in detail, or with reference to the specific embodiments, it is apparent for those skilled in the art that the invention may be modified and changed in various manners without departing from the scope and spirit of the invention.

This invention is based on Japanese Patent Application (Japanese Patent Application No. 2011-099914) filed on Apr. 27, 2011, the content of which is incorporated herein by reference.

INDUSTRIAL APPLICABILITY

A wireless communication device of the invention is useful as a base station, or the like, that can enhance a signal reception characteristic of a wireless communication terminal used in a communication system which utilizes a coordinated multiple-point technique.

DESCRIPTIONS OF THE REFERENCE NUMERALS AND SYMBOLS 101, 201 ANTENNA
103, 203 UE COMMUNICATION IF
105, 205 CONTROL SECTION
107, 207 BS COMMUNICATION IF
151, 251 DATA TRANSMISSION SECTION
153, 253 CONTROL INFORMATION TRANSMISSION SECTION
155, 255 ACK/NACK SIGNAL RECEIVING SECTION
157 RECEPTION QUALITY RECEIVING SECTION
159 SLAVE BASE STATION DETERMINATION SECTION
161 INTER-BASE-STATION DELAY TIME CALCULATION SECTION
163 HARQ CONTROL ALLOCATION DETERMINATION SECTION
165 HARQ CONTROL SELECTION SECTION
167, 261 MULTIPLE DATA TRANSMISSION HARQ CONTROL SECTION
169, 263 IDENTICAL DATA TRANSMISSION HARQ CONTROL
257 COMP PERMISSION SECTION
259 HARQ INFORMATION RECEIVING SECTION
301 ANTENNA

303 BS COMMUNICATION IF
305 CONTROL SECTION
351 DATA RECEIVING SECTION
353 CONTROL INFORMATION RECEIVING SECTION
355 ACK/NACK TRANSMISSION SECTION
361 MULTIPLE DATA RECEIVING PROCESS PROCESSING SECTION
363 IDENTICAL DATA RECEIVING PROCESS PROCESSING SECTION

The invention claimed is:

1. A wireless communication device used in a communication system configured to utilize a coordinated multiple-point technique, the device comprising:
a coordinated multiple-point base station determination section configured to determine another wireless communication device which performs, together with a wireless communication device of interest, multiple-point coordinate with respect to a wireless communication terminal;
an allocation determination section configured to determine for a predetermined number of sub-frames a proportion of multiple-data-transmission automatic repeat request control to identical-data-transmission automatic repeat request control;
a first automatic repeat request control section configured to perform the multiple-data-transmission automatic repeat request control;
a second automatic repeat request control section configured to perform the identical-data-transmission automatic repeat request control; and
a transmission delay time calculation section configured to calculate a transmission delay time existing between the wireless communication device of interest and the other wireless communication device,
wherein the allocation determination section is further configured to:
determine from the transmission delay time an allocation showing a proportion of multiple-data-transmission automatic repeat request control to identical-data-transmission automatic repeat request control for the predetermined number of sub-frames, and
determine the allocation such that the proportion of identical-data-transmission automatic repeat request control increases when the transmission delay time is greater than a predetermined threshold and that the proportion of multiple-data-transmission automatic repeat request control increases when the transmission delay time is less than the predetermined threshold.

2. The wireless communication device according to claim 1, wherein the allocation represents a maximum number of processes used in multiple data transmission HARQ (Hybrid Automatic Repeat reQuest) control that can be included in the predetermined number of sub-frames.

3. The wireless communication device according to claim 1, further comprising a control selection section configured to select, according to the allocation and reception quality of the wireless communication terminal, whether to perform on a per-sub-frame basis multiple-data-transmission automatic repeat request control or identical-data-transmission automatic repeat request control.

4. The wireless communication device according to claim 1, wherein the first automatic repeat request control section is configured to notify the other wireless communication device of a transmission resource responsive to the data transmitted from the wireless communication device to the wireless communication terminal when performing multiple-data-transmission automatic repeat request control.

5. The wireless communication device according to claim 1, wherein the first automatic repeat request control section is configured to notify the other wireless communication device of a transmission resource responsive to the data transmitted from the other wireless communication device to the wireless communication terminal when performing multiple-data-transmission automatic repeat request control.

6. An automatic repeat request control method to be practiced by a wireless communication device used in a communication system configured to utilize a coordinated multiple-point technique, the method comprising:
determining another wireless communication device configured to perform, with the wireless communication device, coordinated multiple-point with respect to a wireless communication terminal;
determining for a predetermined number of sub-frames a proportion of multiple-data-transmission automatic repeat request control to identical-data-transmission automatic repeat request control;
performing on a per-sub-frame basis multiple-data-transmission automatic repeat request control or identical-data-transmission automatic repeat request control according to the determined allocation;
calculating a transmission delay time existing between the wireless communication device and the other wireless communication device;
determining from the transmission delay time an allocation showing a proportion of multiple-data-transmission automatic repeat request control to identical-data-transmission automatic repeat request control for a predetermined number of sub-frames; and
determining the allocation such that the proportion of identical-data-transmission automatic repeat request control increases when the transmission delay time is greater than a predetermined threshold and that the proportion of multiple-data-transmission automatic repeat request control increases when the transmission delay time is less than the predetermined threshold.

7. A wireless communication terminal configured to make communications with a wireless communication device utilizing a coordinated multiple-point technique, the terminal comprising:
a receiving section configured to receive from the wireless communication device control information including a command to perform for a predetermined sub-frame multiple-data-transmission automatic repeat request control or identical-data-transmission automatic repeat request control; and
an automatic repeat request control section configured to perform automatic repeat request control for the sub-frame according to the received control information;
wherein the wireless communication device is configured to:
calculate a transmission delay time existing between the wireless communication device and another wireless communication device,
determine from the transmission delay time an allocation showing a proportion of multiple-data-transmission automatic repeat request control to identical-data-transmission automatic repeat request control for a predetermined number of sub-frames, and
determine the allocation such that the proportion of identical-data-transmission automatic repeat request control increases when the transmission delay time is greater than a predetermined threshold and that the proportion of multiple-data-transmission automatic repeat request control increases when the transmission delay time is less than the predetermined threshold.

8. An automatic repeat request control method to be practiced by a wireless communication terminal configured to make communications with a wireless communication device utilizing a coordinated multiple-point technique, the method comprising:

receiving from the wireless communication device control information including a command to perform for a predetermined sub-frame multiple-data-transmission automatic repeat request control or identical-data-transmission automatic repeat request control; and performing automatic repeat request control for the sub-frame according to the received control information, wherein the wireless communication device is configured to:

calculate a transmission delay time existing between the wireless communication device and another wireless communication device, determine from the transmission delay time an allocation showing a proportion of multiple-data-transmission automatic repeat request control to identical-data-transmission automatic repeat request control for a predetermined number of sub-frames, and determine the allocation such that the proportion of identical-data-transmission automatic repeat request control increases when the transmission delay time is greater than a predetermined threshold and that the proportion of multiple-data-transmission automatic repeat request control increases when the transmission delay time is less than the predetermined threshold.

* * * * *